US 12,223,491 B2

(12) United States Patent
Powers et al.

(10) Patent No.: US 12,223,491 B2
(45) Date of Patent: *Feb. 11, 2025

(54) MULTISCREEN INTERACTIVE WORKFLOW FACILITATION VIA A REAL-TIME DATABASE (71) Applicant: MindBody, Inc., San Luis Obispo, CA (US)

(72) Inventors: Bartley B. Powers, Creston, CA (US); Ramses Eneko Alonso Cueva, San Luis Obispo, CA (US)

(73) Assignee: MindBody, Inc., San Luis Obispo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/449,415

(22) Filed: Aug. 14, 2023

(65) Prior Publication Data
US 2023/0385802 A1 Nov. 30, 2023

Related U.S. Application Data (63) Continuation of application No. 15/659,117, filed on Jul. 25, 2017, now Pat. No. 11,727,382.

(51) Int. Cl.
G06Q 20/32 (2012.01)
G06F 16/9535 (2019.01)
(Continued)

(52) U.S. Cl.
CPC ......... *G06Q 20/3224* (2013.01); *G06Q 20/10* (2013.01); *G06Q 20/202* (2013.01);
(Continued)

(58) Field of Classification Search
CPC .. G06Q 20/3224; G06Q 20/10; G06Q 20/202; G06Q 30/06; G06Q 10/02;
(Continued)

(56) References Cited

U.S. PATENT DOCUMENTS

2012/0210349 A1 8/2012 Campana et al.
2013/0124412 A1 5/2013 Itwaru
(Continued)

FOREIGN PATENT DOCUMENTS

WO 2016/183552 11/2016
WO 2019/022853 1/2019

OTHER PUBLICATIONS

Al-Hazmi, Yahya. Unification of Monitoring Interfaces of Federated Cloud and Future Internet Testbed Infrastructures. Technische Universitaet Berlin (Germany) ProQuest Dissertations Publishing, 2016. (Year: 2016).*

(Continued)

*Primary Examiner* — Florian M Zeender
*Assistant Examiner* — Fawaad Haider
(74) *Attorney, Agent, or Firm* — DLA PIPER LLP (US)

(57) ABSTRACT

Methods, systems, and media are provided for coordinating an interactive workflow between a first end user device having a first display and a first client application, and a second end user device having a second display and a second client application. In one example, a method comprises connecting the first end user device to a real-time database and setting a first listener on a field or table of the real-time database, connecting the second end user device to the real-time database and setting a second listener on the same or a different field or table of the real-time database.

20 Claims, 8 Drawing Sheets (51) Int. Cl.

| | | |
|---|---|---|
| *G06F 16/955* | (2019.01) | |
| *G06Q 10/02* | (2012.01) | |
| *G06Q 10/0631* | (2023.01) | |
| *G06Q 10/087* | (2023.01) | |
| *G06Q 10/1093* | (2023.01) | |
| *G06Q 20/10* | (2012.01) | |
| *G06Q 20/20* | (2012.01) | |
| *G06Q 30/06* | (2023.01) | |
| *G07F 19/00* | (2006.01) | |
| *G07G 1/01* | (2006.01) | |
| *H04L 9/40* | (2022.01) | |
| *H04L 67/02* | (2022.01) | |
| *H04L 67/10* | (2022.01) | |

(52) U.S. Cl.
CPC ........... *G06Q 30/06* (2013.01); *G07F 19/206* (2013.01); *G07G 1/01* (2013.01); *G06F 16/9535* (2019.01); *G06F 16/955* (2019.01); *G06Q 10/02* (2013.01); *G06Q 10/06311* (2013.01); *G06Q 10/087* (2013.01); *G06Q 10/1097* (2013.01); *H04L 63/0853* (2013.01); *H04L 63/10* (2013.01); *H04L 63/102* (2013.01); *H04L 67/02* (2013.01); *H04L 67/10* (2013.01)

(58) Field of Classification Search
CPC ........... G06Q 10/06311; G06Q 10/087; G06Q 10/1097; G07F 19/206; G07G 1/01; G06F 16/9535; G06F 16/955; H04L 63/0853; H04L 63/10; H04L 63/102; H04L 67/02; H04L 67/10
USPC .......................................................... 705/21
See application file for complete search history.

(56) References Cited

U.S. PATENT DOCUMENTS

| | | |
|---|---|---|
| 2014/0006165 A1 | 1/2014 | Grigg et al. |
| 2016/0005043 A1 | 1/2016 | Goldstone et al. |
| 2016/0086253 A1* | 3/2016 | Wu .................... G06Q 30/0633 |
| | | 705/26.8 |
| 2017/0116298 A1 | 4/2017 | Ravipati et al. |
| 2017/0178104 A1 | 6/2017 | Fernandez |

OTHER PUBLICATIONS

Nivas, "Practical End-to-End Performance Evaluation of Backend Software Applications," The University of Texas at Arlington ProQuest Dissertations Publishing, 2013.
Terrenghi, et al., "A taxonomy for and analysis of multi-person-display ecosystems," Personal and Ubiquitous Computing 13, Nov. 2009, pp. 583-598.
Ma, "Famulus—an automated usability testing system for mobile applications," Diss. University of Massachusetts Lowell, ProQuest Dissertations Publishing, 2014.
Cheng, "Interactive visualization for missing values, time series, and areal data." Diss. Iowa State University, ProQuest Dissertations Publishing, 2015.
PCT International Application No. PCT/US18/36705, International Preliminary Report on Patentability, dated Oct. 25, 2019, 6 pages.
PCT International Application No. PCT/US18/36705, Demand for International Preliminary Examination, dated May 22, 2019, 22 pages.
PCT International Application No. PCT/US18/36705, Written Opinion of the International Preliminary Examning Authority, dated Jul. 11, 2019, 6 pages.
PCT International Application No. PCT/US18/36705, International Search Report, dated Aug. 23, 2018, 2 pages.
PCT International Application No. PCT/US18/36705, Written Opinion, dated Aug. 23, 2018, 6 pages.
Perez, "Revel Systems Debuts An iPad Point-Of-Sale In A Box," TechCrunch, https://techcrunch.com/2012/06/27/revel-systems-debuts-an-ipad-point-of-sale-in-a-box/, Jun. 27, 2012, 10 pages.
Piynt Smart Terminal, Poynt, https://web.archive.org/20170603213450/https://poynt.com/, 2017, 4 pages.
IPad POS, Revel Systems, https://support.revelsystems.com/hc/en-us/sections/201859596-iPad-POS, 2017, 6 pages.
Examination Report No. 1 for Australian Patent Application No. 2023266396 dated Nov. 4, 2024, 2 pages.
Examination Search Report of CA Patent Application No. 3,070,755, dated Aug. 21, 2024, 3 pages.

* cited by examiner

```
40915:{
  location:{
    1:{
      register:{
        1:{
          "cartID":"123445678",
          "cartState":"standby",
          "lastUpdated":"1498854108"
          ~~~~~~~~~~~~~~~~~~~~~~~~~~
        }
        ~~~~~~~~~~~~~~~~~~~~~~~~~~~~
      }
      ~~~~~~~~~~~~~~~~~~~~~~~~~~~~~~
    }
    ~~~~~~~~~~~~~~~~~~~~~~~~~~~~~~~~
  }
~~~~~~~~~~~~~~~~~~~~~~~~~~~~~~~~~~~~
```

*Fig. 8*

MULTISCREEN INTERACTIVE WORKFLOW FACILITATION VIA A REAL-TIME DATABASE

CROSS-REFERENCE TO RELATED APPLICATION

This application is a continuation of U.S. application Ser. No. 15/659,117, filed Jul. 25, 2017, which is incorporated by reference in its entirety.

TECHNICAL FIELD

The subject matter disclosed herein generally relates to the technical field of special-purpose machines that facilitate adding new functionality to interactive workflows and interactive workflow interfaces, including software-configured computerized variants of such special-purpose machines and improvements to such variants, and to the technologies by which such special-purpose machines become improved compared to other special-purpose machines that facilitate adding the new features.

One example embodiment uses a real-time database to provide a multiscreen interactive point of sale experience on multiple devices regardless of user location, device platform, and network.

BACKGROUND

The present subject matter seeks to address the limited functionality and inconvenience often presented by conventional checkout systems. These systems are often positioned at points of sale (POS) at retail outlets, brick-and-mortar stores, service providers (e.g., doctor's rooms, yoga studio), and so forth.

Portable electronic devices such as "smart phones" are becoming even more ubiquitous in presence and use. Conventional checkout systems that try to invoke the functionality of these devices typically need special physical hardware. Some arrangements include a smart tablet mounted on a rotatable stand positioned on a checkout counter. During a checkout session, the tablet needs to be rotated back and forth between sales agent and customer as the various steps of a transaction are performed sequentially by each party. This awkward back and forth movement does not lend itself to a smooth transaction, and can actually introduce unintended errors into the transaction if a person signs at the wrong time, or misses an opportunity to select a cash back option, for example. Neither party sees the same information simultaneously as the tablet screen is only visible to one person at a time, and this can sometimes cause certain steps in the transaction flow to be miscued or repeated.

BRIEF DESCRIPTION OF THE DRAWINGS

Some embodiments are illustrated by way of example and not limitation in the figures of the accompanying drawings.

DETAILED DESCRIPTION

"Carrier Signal" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"Client Device" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"Communications Network" or "Network" in context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"Component" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device or other tangible media able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, Mindbody, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
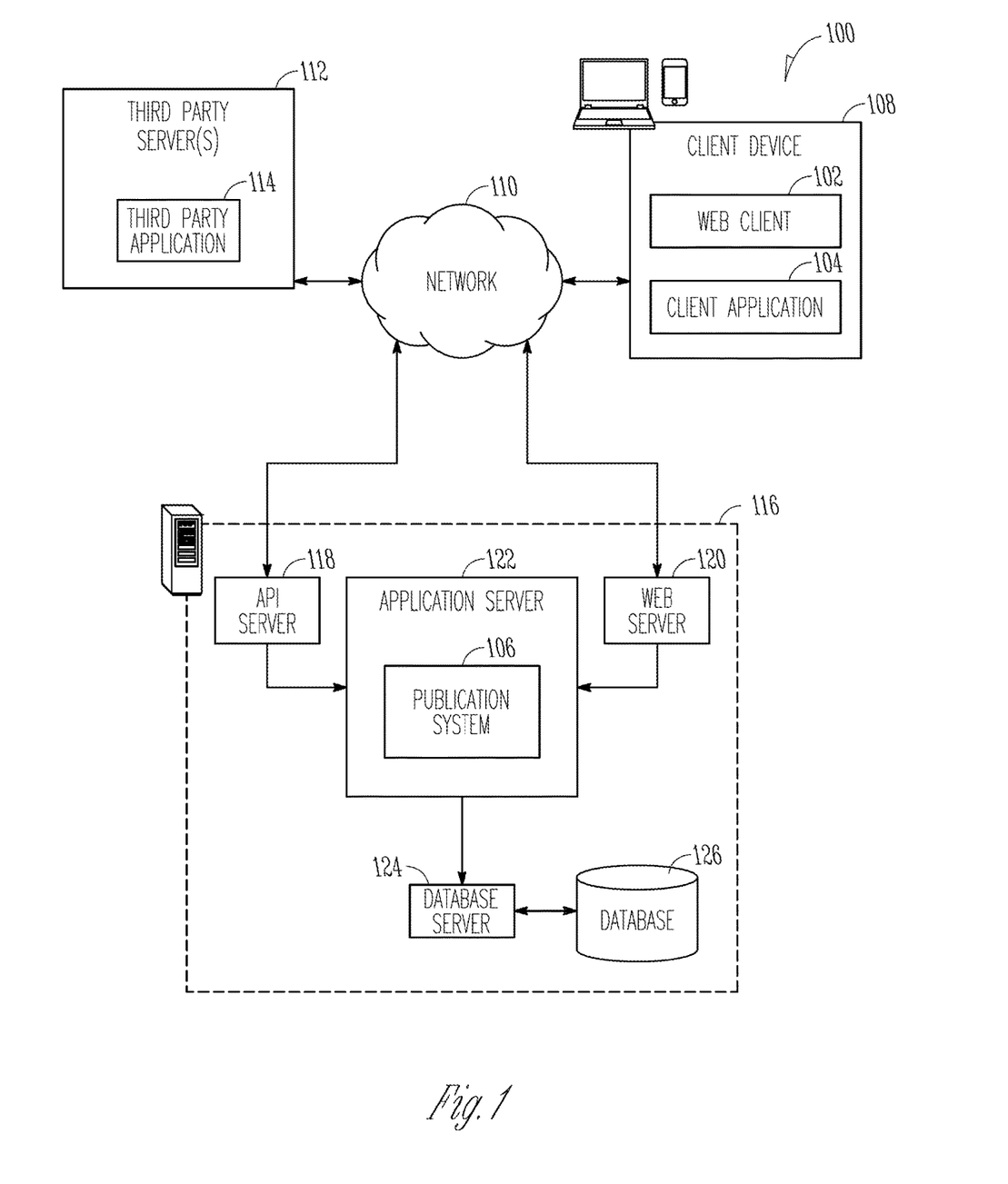
FIG. 1 is a block diagram illustrating a networked system, according to an example embodiment.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of a client application 104, are hosted and execute on the client device 108. The networked system 116 includes an application server 122, which in turn hosts a publication system 106 (such as the publication system hosted at mindbodyonline.com by Mindbody Inc. of San Luis Obispo, CA) that provides a number of functions and services to the application 104 that accesses the networked system 116. The application 104 also provides a number of interfaces described herein, which present output of the scheduling operations to a user of the client device 108.

The client device 108 enables a user to access and interact with the networked system 116, and ultimately the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126, which in some examples may include a real-time database 126). In an example embodiment, the database 126 includes storage devices that store information accessed and generated by the publication system 106. The database 126 may include a real-time database as described elsewhere herein.

Additionally, a third-party application 114, executing on a third-party server(s) 112, is shown as having programmatic access to the networked system 116 via the programmatic interface provided by the Application Program Interface (API) server 118. For example, the third-party application 114, using information retrieved from the networked system 116, may support one or more features or functions on a website hosted by the third party.

Turning now specifically to the applications hosted by the client device 108, the web client 102 may access the various systems (e.g., publication system 106) via the web interface supported by the web server 120. Similarly, the application 104 (e.g., an "app" such as a Mindbody Inc. app) accesses the various services and functions provided by the publication system 106 via the programmatic interface provided by the Application Program Interface (API) server 118. The application 104 may be, for example, an "app" executing on a client device 108, such as an iOS or Android OS application to enable a user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is not limited to such an architecture, and could equally well find application in a distributed, or peer-to-peer, architecture system, for example. The publication system 106 could also be implemented as a stand-alone software program, which does not necessarily have networking capabilities.

Figure 2:
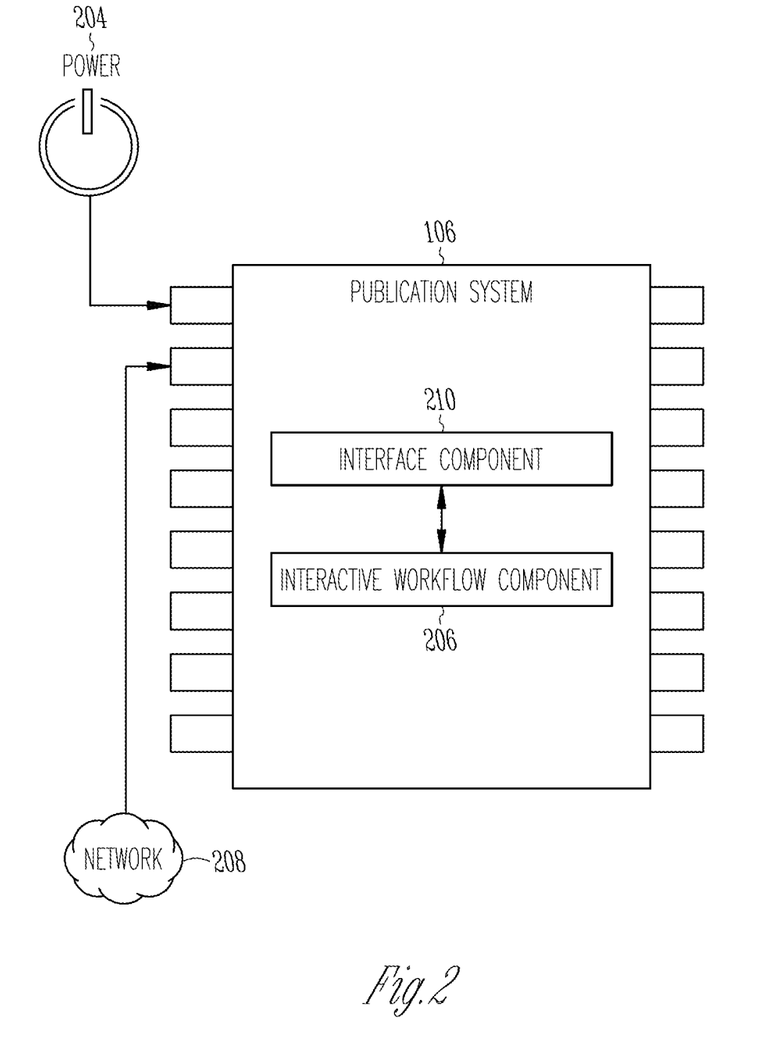
FIG. 2 is a block diagram showing for the architectural details of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over the network 208) with other systems within the SaaS network architecture 100.

The interface component 210 is communicatively coupled to a interactive workflow component 206 that operates, in conjunction with a real-time database 126, to provide multiscreen interactive workflow facilitation services in accordance with the methods described further below with reference to the accompanying drawings.

Figure 3:
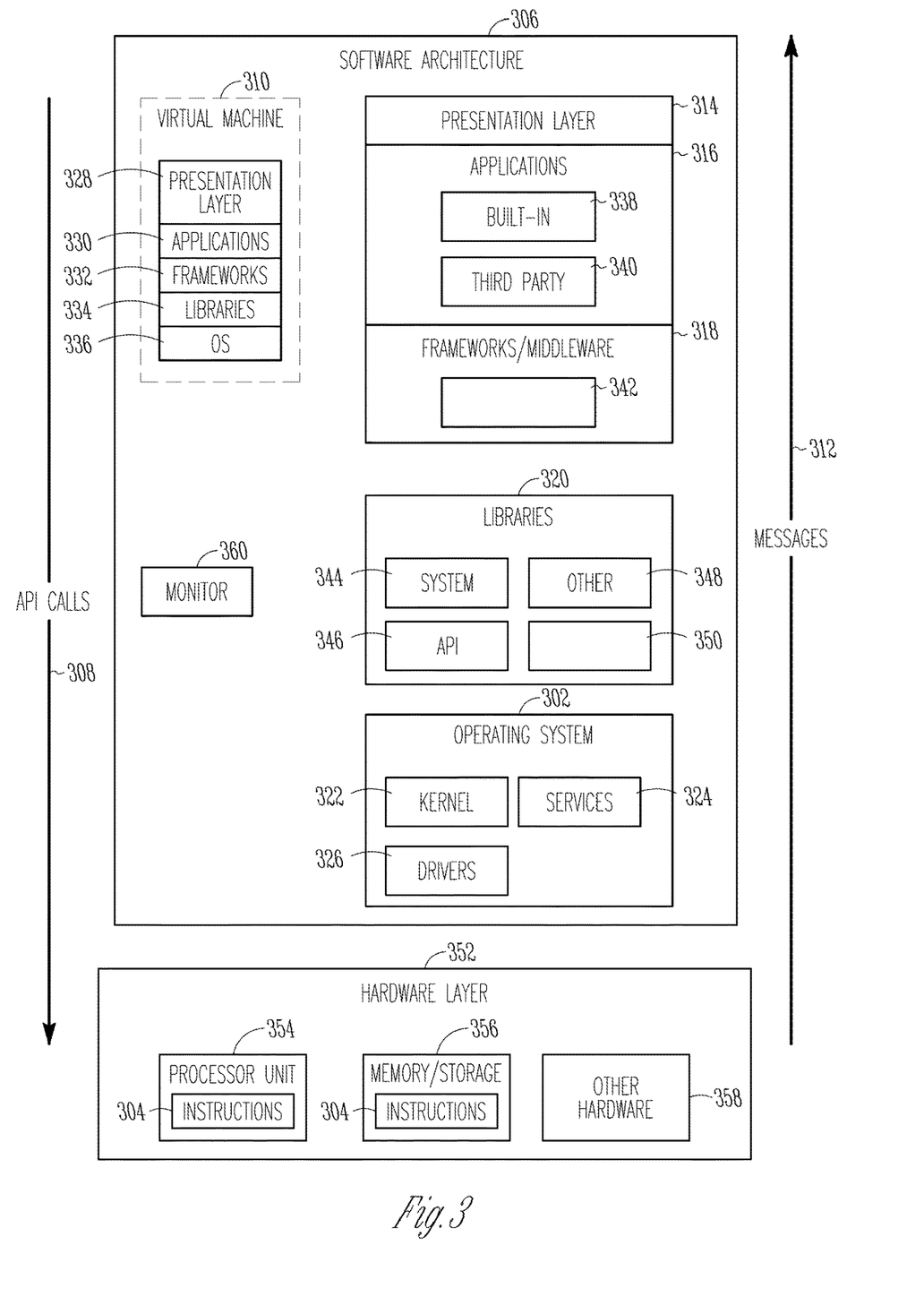
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processor unit 354 having associated executable instructions 304. Executable instructions 304 represent the executable instructions of the software architecture 306, including implementation of the methods, components, and so forth described herein. The hardware layer 352 also includes memory and/or storage modules as memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as messages 312 in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built-in operating system functions (e.g., kernel 322, services 324 and/or drivers 326), libraries 320, and frameworks/middleware 318 to create user interfaces to interact with users of the system. Alternatively, or additionally, in some systems, interactions with a user may occur through a presentation layer, such as presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system (OS) 336 in FIG. 3) and typically, although not always, has a virtual machine monitor 360, which manages the operation of the virtual machine 310 as well as the interface with the host operating system (i.e., operating system 302). A software architecture executes within the virtual machine 310 such as an operating system (OS) 336, libraries 334, frameworks 332, applications 330 and/or presentation layer 328. These layers of software architecture executing within the virtual machine 310 can be the same as corresponding layers previously described or may be different.

Figure 4:
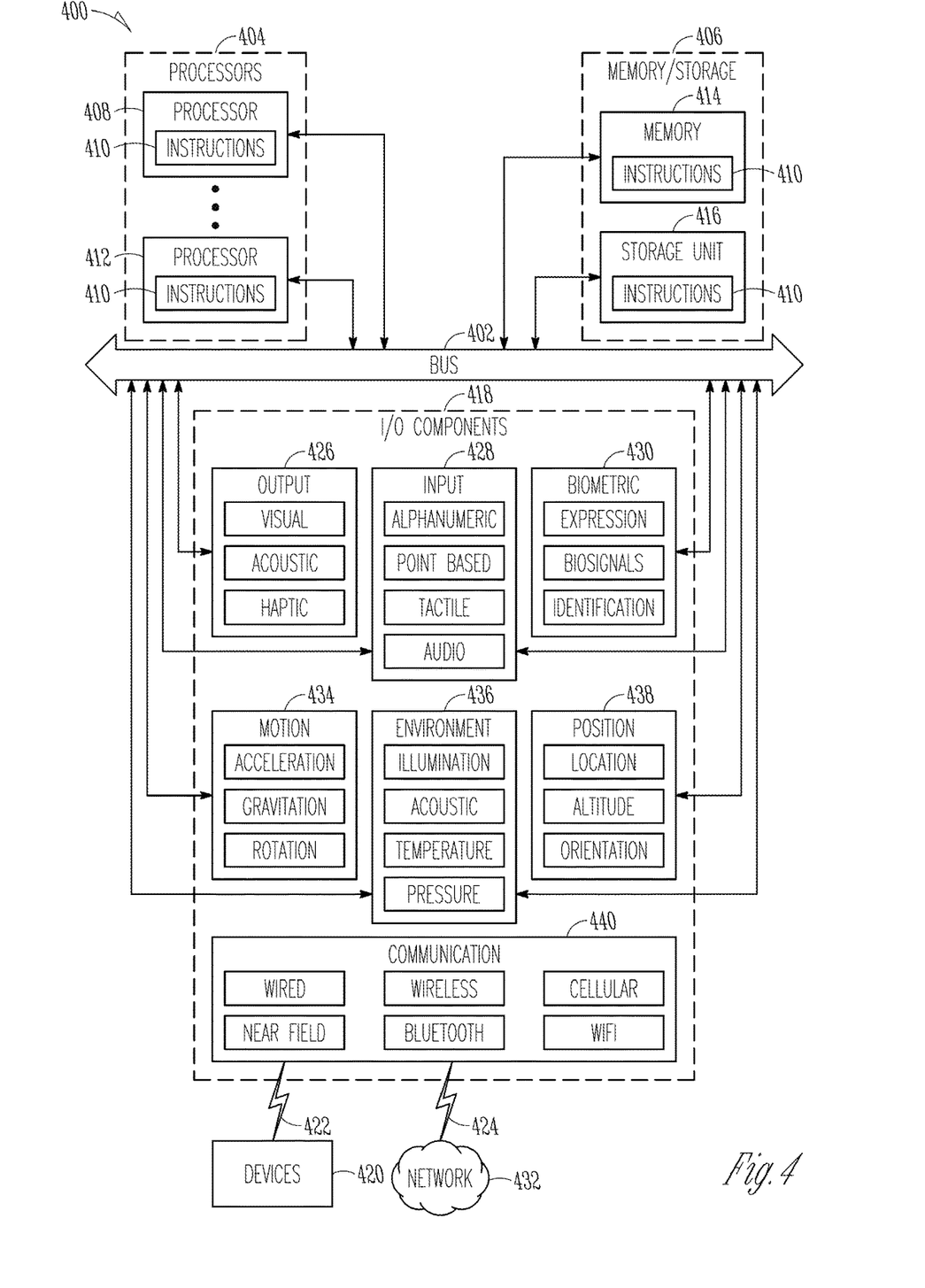
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via coupling 424 and coupling 422, respectively. For example, the communication components 440 may include a network interface component or other suitable device to interface with the network 432. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a Universal Serial Bus (USB)).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting a NFC beacon signal that may indicate a particular location, and so forth.

The improved technology described herein uses a real-time database to provide multiscreen interactive point of sale experience on multiple devices regardless of user location, device platform, and network. This solution is completely device agnostic, network agnostic, and location agnostic. In some examples, and with reference to FIG. 5, one solution merely invokes two devices (more can be accommodated), some sort of data connection, and the applications installed on either device; no special hardware or connection is required.

In one example use case, a client could be in Philadelphia on an iPhone connected to any Wi-Fi network and a staff member could be in Los Angeles on an Android tablet connected to Verizon 4G and they can complete a point of sale transaction involving continuous sequential input from both sides as if they were standing in front of one another in real-time.

This functionality is enabled in one aspect by connecting both devices to the same real-time database. Both devices listen and send information to a specific element within the database. As this element is updated, the devices can complete a simple workflow by letting each other know the step they are on in the point of sale transaction. This creates a seamless flow that can be completed on any device and any network from anywhere.

In another example use case, the present solution also allows multiple client-facing stations, such that a staff member can select the display of a real-time electronic checkout cart on any client-facing station they choose, and without having to rotate any of the checkout stations as is done conventionally.

The solution can also be incorporated into an service app allowing, for example, a hair stylist to add items to a cart while a client can pull out a personal phone and watch as items are being entered and updated in the cart, sign to authorize a payment on the phone, and add a tip without exchanging devices or connecting to a specific network or tapping phones together.

Figure 5:
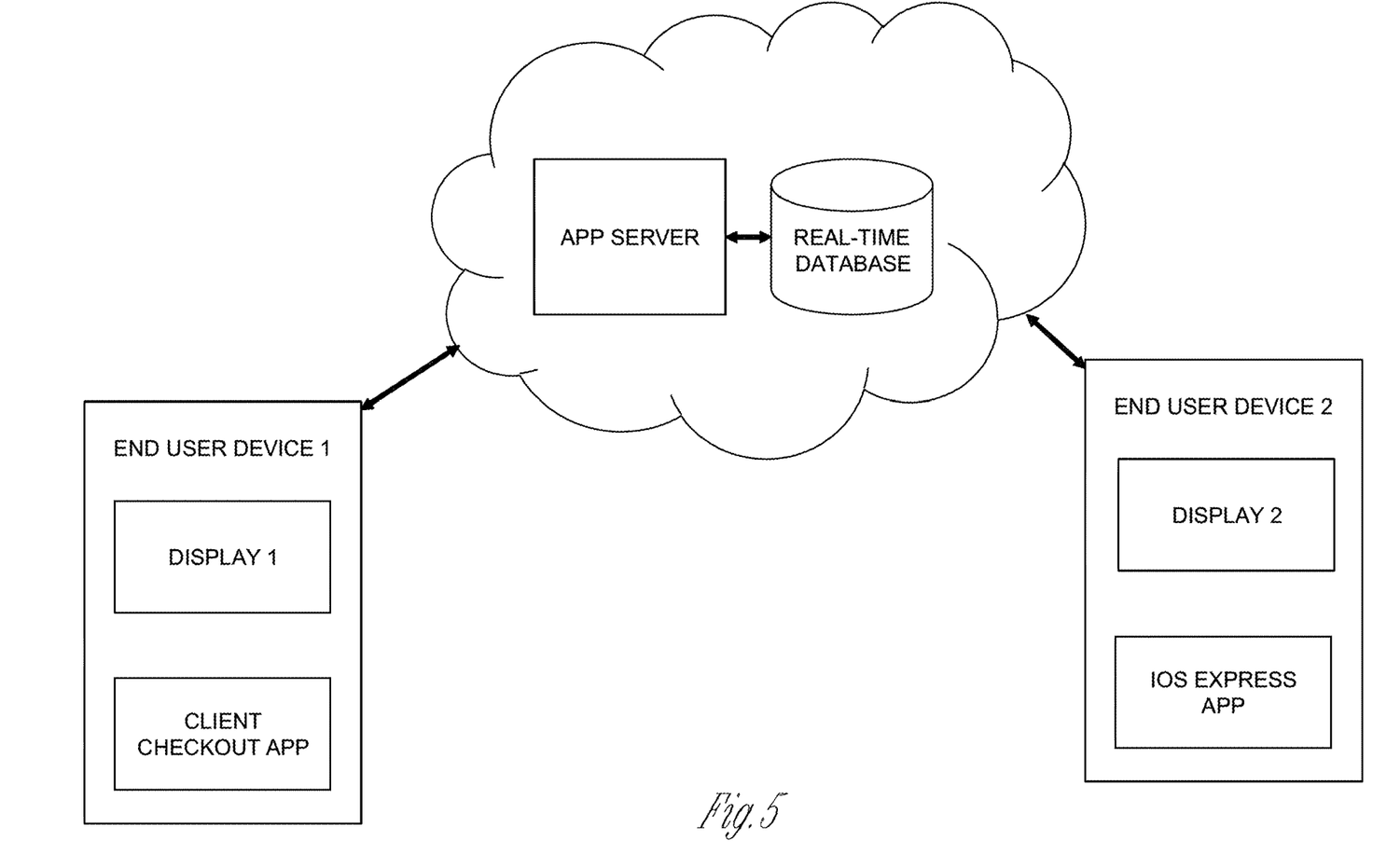
FIG. 5 illustrates a representative system environment, which may be used in conjunction with various hardware architectures herein described.

The inventive subject matter allows multiple mobile devices that may be operating on remote networks to display complementary content based on interactions on each device. For example, an end user can request to purchase a product or service via a first app on a first device to cause that product or service to be added to a cart displayed in a second app on a second device. A salesperson operating the second device can, for example, ring up the transaction by selecting a "Complete Sale" button in the second app/device which will cause the first app/device to display a signature form to capture the user's signature. Thus the disclosure specifies, at a minimum, a first end user device (e.g., smartphone, tablet, watch, etc.) having a first display and a first client application (i.e., a purchasing app or "Client Checkout"); a remote server and a real-time database, such as real-time database 126, in which the server includes software that receives inputs from end user devices for updating the real-time database; and a second end user device having a second display and a second client application (i.e., a selling app or "iOS Express"). A representative system diagram is illustrated in FIG. 5 of the accompanying drawings.

In one use case scenario, a studio client operating the first app (purchasing app) on his or her phone interacts with a studio employee operating the second app (selling app) on a studio device. In some examples, the studio may provide both the first device with the purchasing app and the second device with the selling app. More specifically, a studio employee may have provided services to a customer (client) and wishes to conclude a sales transaction at the conclusion of the performance of those services. The employee can log into a studio-related app having checkout capability on a studio device, and a secure connection with a real-time database, such as real-time database 126, is established.

Figure 8:
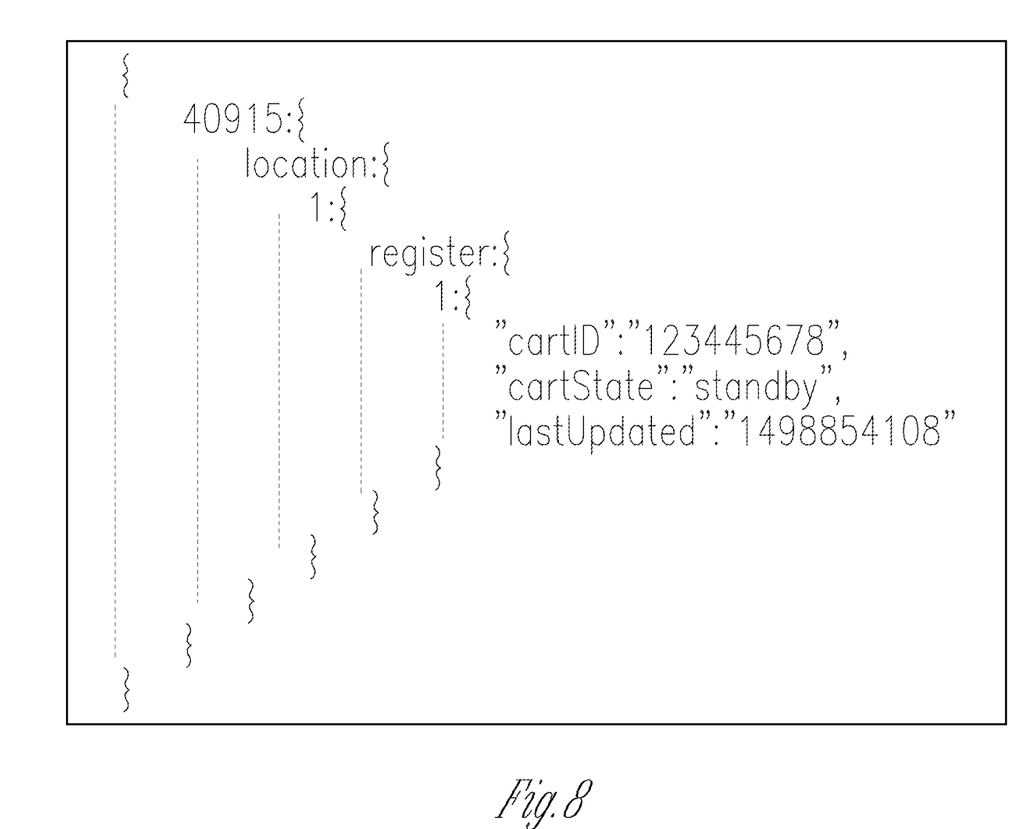
FIG. 8 is an example representation of an aspect of a real-time database, according to an example embodiment.

The studio has a unique ID within the database 126 and a child element associated all the pertinent info, for example, as shown in the example representation in FIG. 8 of the accompanying drawings.

The client also logs into a client-facing retail application installed on the client device and the generated token is also used to establish a secure connection with the real-time database 126. The client-facing retail app has a listener set on the shared child element and will respond to any updates from the studio-related app.

Within the studio-related app, the studio employee can send data to the common element from anywhere in the app when she wants the client-facing retail app to display the same (or other particular) information on the client's device. Similarly, the same can be done in reverse when the client sends information and updates (e.g., a signature) from the client-facing retail app back to the studio-related app. Through the listening and updating of a common element in the database, the information displayed on the two devices is in material respects identical, and actions taken on one device can be seen on the other. Further, using the information sent through the common element, for example a cart ID, the studio can make use of their own APIs and the studio employee can display any information she chooses in real-time. The simultaneous multi-screen functionality provided by the present disclosure facilitates the convenient facilitation of interactive workflows, especially between two persons involved in an iterative transaction requiring sequential actions by each party.

Figure 6:
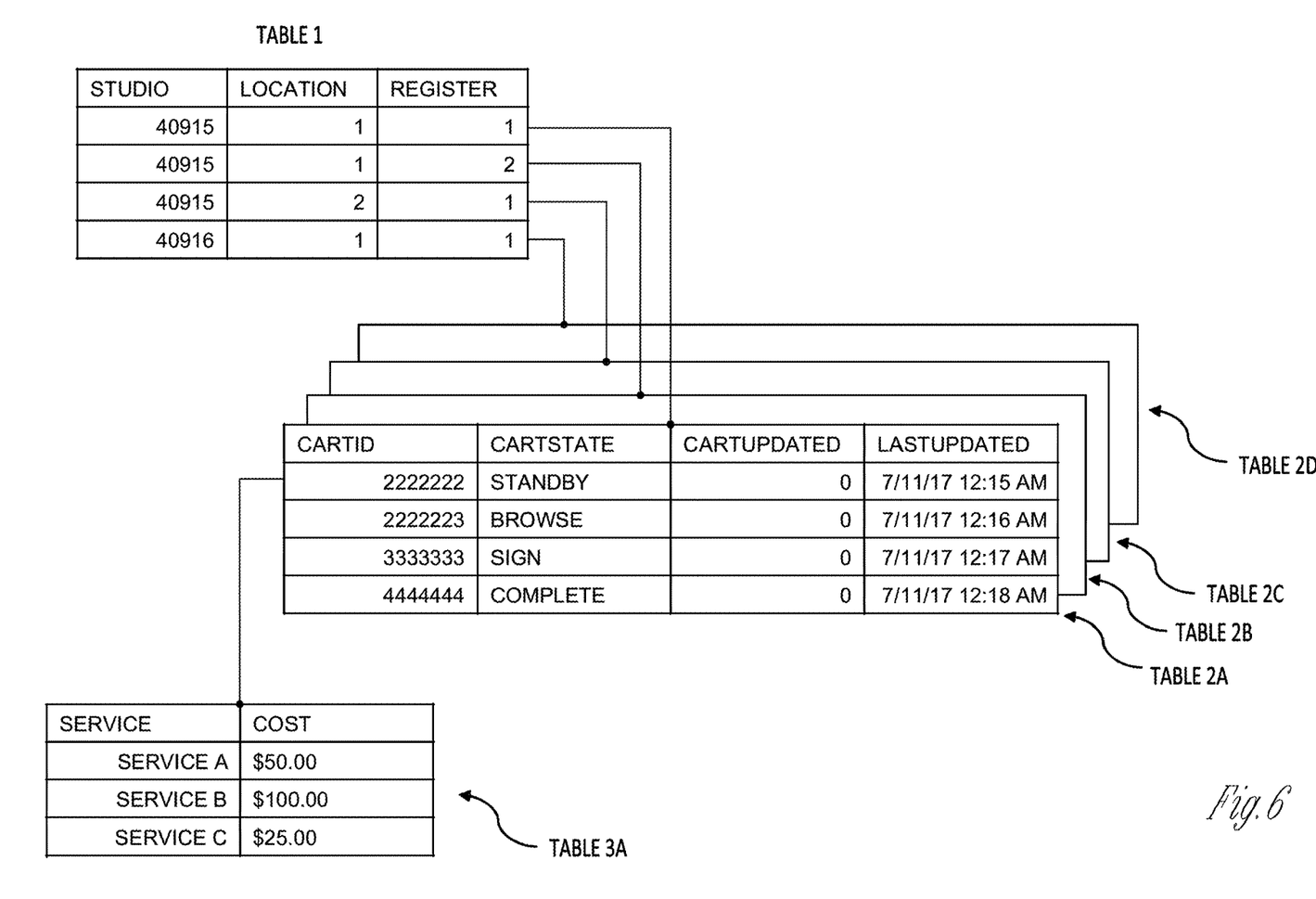
FIG. 6 is an example representation of a real-time database, according to an example embodiment.

FIG. 6 is an example representation of data stored within the real-time database 126. With reference thereto, the real-time database 126 generally stores data for each business (e.g., studios, location, register as shown in Table 1) and the businesses' transactions (i.e., for example keyed by cartID's in Tables 2a-2d).

The first client app has a listener on a field (e.g., cartID, cartState, cartUpdated, etc.) or a table (e.g., Table 2a) in the real-time database 126. The listener can be implemented in various ways. In one approach, the first client app continuously polls the real-time database 126 to determine whether any changes have occurred to the field or table. In another approach, a database/data access API is invoked that will send a notification that a change to the field/table has been made.

One example method flow includes at least the following operations:
- a first device/first app connects to the real-time database and sets a first listener on a field/table of the real-time database;
- a second device/second app also connects to the real-time database and also sets a second listener on the same or different fields/tables of the real-time database;
- the first device/first app receives a user input, such as to add a product/service to a virtual shopping cart as part of a transaction flow;
- the first device/first app sends the request to a server, which processes the request and updates the real-time database, such as by creating a new entry for the product/service or sending a cartID to the real-time database, for example as shown in Table 3a of FIG. 6, toggling the cartUpdated flag, and updating the lastUpdated timestamp, etc.;

in some examples, the second device/second app determines that the virtual shopping cart has been updated via the second listener and will retrieve the newly added product/service from the real-time database and display the newly added product/service on the second device/second app;

in some examples, the second app retrieves the above cartID, and notes via the cart update or lastupdated flag that the cart was updated, so it sends the cartID to a service app (such as a Mindbody API) and retrieves the items that got added to that cart;

the first device/first app also determines that the virtual shopping cart has been updated via the first listener;

the first device also displays the newly added product/service on the first device/first app;

the second app/second device rings up the transaction, such as by a studio employee selecting a "Complete Sale" button in the second app/device;

the second app/second device sends a request to the server to process the transaction;

the server performs underlying business logic, such as totaling the transaction, calculating sales tax, retrieving previously stored credit card information, and so forth;

the server also updates the state of the cart, such as by changing the value of cartState from "standby" to "sign";

the first app/device determines that the cart has been updated via the first listener, and, based on the current state (i.e., "sign"), the first app/device displays a signature form for an end user to enter his/her signature;

the second app/device also determines that the cart has been updated via the second listener;

the second app/device may or may not perform any additional actions.

In one embodiment, the second app/device may ignore events that cause the cartState to change to the "sign" state. In another embodiment, the second app/device may display the signature being entered from the first app/device; the first app/device determines that the transaction has completed. For example, the first app may include an "OK" button for a user to select upon the user completing the signature, or the first app may determine a period of inactivity following entry of a signature.

The first app/device sends a request to the server to complete the transaction; the server receives the request to complete the transaction and performs certain business logic, such as requesting a payment from a credit card company, generating a receipt, and storing the transaction in more permanent storage. The server can also update the cartState from "sign" to "complete."

The second app/device also determines that the transaction is complete based on the cartState changing from "sign" to "complete." The second app/device may or may not perform additional actions. In one embodiment, the second app/device may ignore events that cause the cartState to change to the "complete" state. In another embodiment, the second app/device may display another UI screen allowing a user to select to email a receipt to the purchaser, print a receipt, and/or email and print the receipt.

Thus, in some embodiments, there is provided a system for coordinating an interactive workflow between a first end user device having a first display and a first client application, and a second end user device having a second display and a second client application, the system comprising: a network; a remote server; a real-time database; processors; and a memory storing instructions that, when executed by at least one processor among the processors, cause the system to perform operations comprising, at least: connecting the first end user device to the real-time database and setting a first listener on a field or table of the real-time database; connecting the second end user device to the real-time database and setting a second listener on the same or a different field or table of the real-time database; receiving, at the server, a user input or request made via the first end user device; processing, at the server, the user input or request and updating the field or table of the real-time database based on the user input or request; notifying, via the second listener, the second end user device that a field or table of the real-time database has been updated; notifying, via the first listener, the first end user device that a field or table of the real-time database has been updated; and receiving, at the server, a request to perform or complete a transaction.

In some embodiments, the user input or request may include a request to add a product or service to a virtual shopping cart as part of a transaction flow. Updating the field or table of the real-time database may include creating a new data entry for the product or service. Notifying the second end user device that a field or table of the real-time database has been updated may include retrieving the newly added product or service data entry from the real-time database and causing the display of the newly added product or service in the display of the second end user device.

In some embodiments, notifying the first end user device that a field or table of the real-time database has been updated further includes causing the display of the newly added product or service in the display of the first end user device. The operation may further comprise executing business logic, including one or more of totaling the transaction and retrieving previously stored credit card information, in response to receiving the request to perform or complete the transaction.

Figure 7:
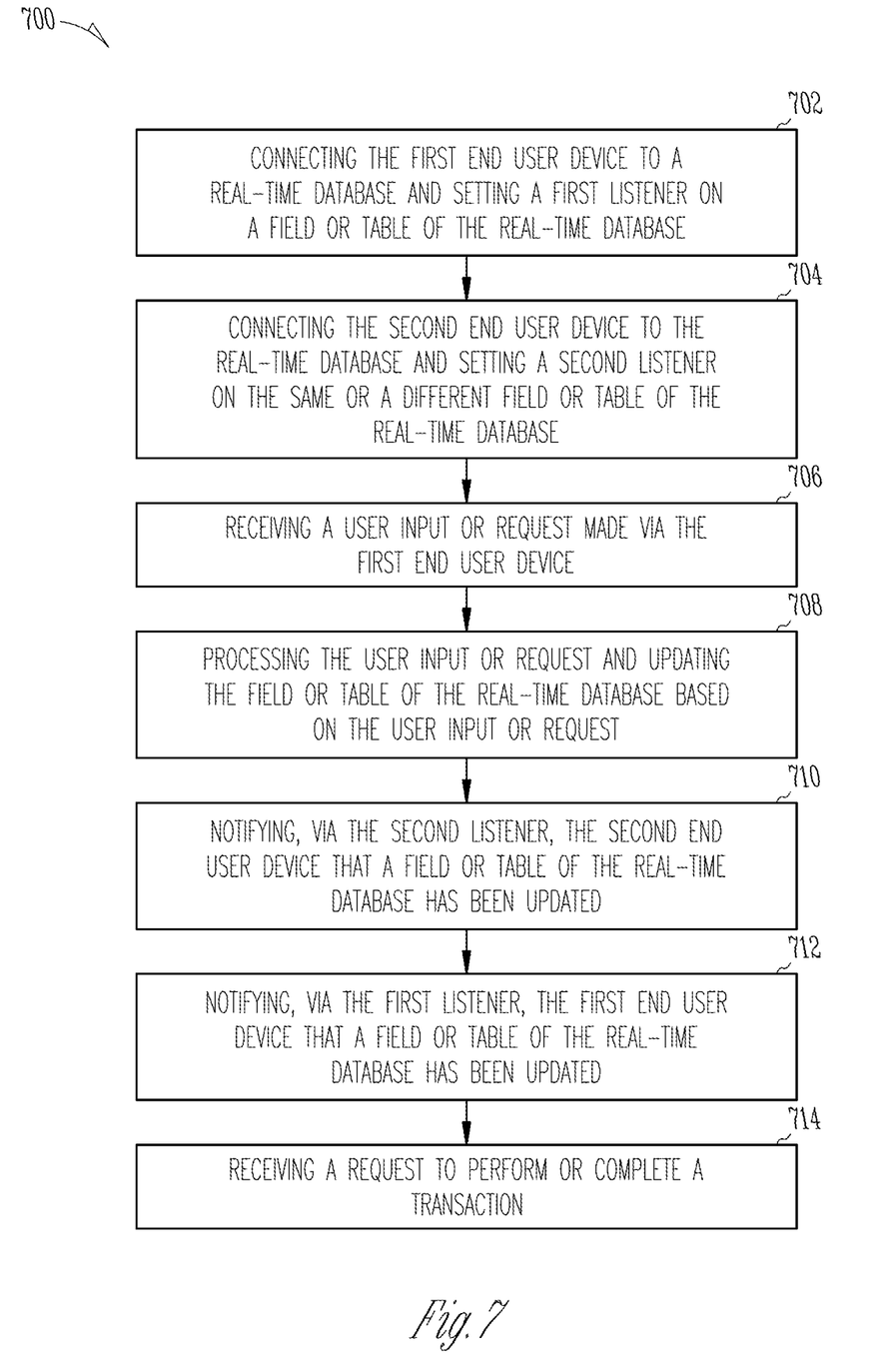
FIG. 7 is a flowchart of a method for coordinating an interactive workflow, according to an example embodiment.

Some embodiments of the present inventive subject matter include methods for coordinating an interactive workflow between a first end user device having a first display and a first client application, and a second end user device having a second display and a second client application. A flow diagram for one example method 700 is illustrated in FIG. 7. The method 700 includes, at block 702, connecting the first end user device to a real-time database and setting a first listener on a field or table of the real-time database; at block 704, connecting the second end user device to the real-time database and setting a second listener on the same or a different field or table of the real-time database; at block 706, receiving a user input or request made via the first end user device; at block 708, processing the user input or request and updating the field or table of the real-time database based on the user input or request; at block 710, notifying, via the second listener, the second end user device that a field or table of the real-time database has been updated; at block 712, notifying, via the first listener, the first end user device that a field or table of the real-time database has been updated; and, at block 714, receiving a request to perform or complete a transaction.

In some embodiments, the user input or request may include a request to add a product or service to a virtual shopping cart as part of a transaction flow. Updating the field or table of the real-time database may include creating a new data entry for the product or service. Notifying the second end user device that a field or table of the real-time database has been updated may include retrieving the newly added product or service data entry from the real-time database and causing the display of the newly added product or service in the display of the second end user device.

In some embodiments, notifying the first end user device that a field or table of the real-time database has been updated further includes causing the display of the newly added product or service in the display of the first end user device. The operation may further comprise executing business logic, including one or more of totaling the transaction and retrieving previously stored credit card information, in response to receiving the request to perform or complete the transaction.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for coordinating an interactive workflow between a first end user device having a first display and a first application, and a second end user device having a second display and a second application, the system comprising:
    a server;
    a real-time database;
    processors; and
    a memory storing instructions that, when executed by at least one processor among the processors, cause the system to perform operations comprising, at least:
        connecting the first end user device to the real-time database, wherein connecting the first end user device comprises interfacing with the first application of a first type executing locally on the first end user device, the first application being associated with a first user type, wherein the first end user device is connected to the real-time database via a first listener of the first application set on a table of the real-time database;
        connecting the second end user device to the real-time database, wherein connecting the second end user device comprises interfacing with the second application of a second type executing locally on the second end user device, the second application being associated with a second user type, wherein the second end user device is connected to the real-time database via a second listener of the second application set on the table of the real-time database, wherein the first listener and the second listener are both set on the table of the real-time database; and
        coordinating an interactive workflow between the first end user device and the second end user device, the coordinating comprising:
            receiving, at the server, a first user input associated with a first step of the interactive workflow performed at the first end user device, wherein the first step prompts the second end user device to perform a second step of the interactive workflow;
            updating a table element corresponding to the first user input;
            prompting, via the second listener in real time, the second end user device to perform the second step at the second end user device;
            receiving, at the server from the second end user device, a second user input associated with the second step of the interactive workflow; and
            updating the table element corresponding to the second user input.

2. The system of claim 1, further comprising:
    providing an indication of a value corresponding to the table element to the second end user device when prompting the second end user device to perform the second step at the second end user device.

3. The system of claim 1, wherein coordinating the interactive workflow between the first end user device and the second end user device comprises:
    providing multiscreen interactive workflow facilitation services between the first end user device and the second end user device.

4. The system of claim 1, wherein prompting, via the second listener in real time, the second end user device to perform the second step at the second end user device comprises:
    notifying the second end user device that the first end user device has completed the first step in the interactive workflow.

5. The system of claim 1, wherein the first user input includes a request to add a product or service to a virtual shopping cart.

6. The system of claim 5, wherein updating the table element corresponding to the first user input comprises:
    updating one or more of a virtual cart identifier or a virtual cart state based on the request to add the product or the service to the virtual shopping cart.

7. The system of claim 6, wherein prompting, via the second listener in real time, the second end user device to perform the second step at the second end user device comprises:
    providing the second end user device with the one or more of the virtual cart identifier or the virtual cart state.

8. A computer-implemented method for coordinating an interactive workflow between a first end user device having a first display and a first client application, and a second end user device having a second display and a second client application, the method comprising:

connecting the first end user device to a real-time database, wherein connecting the first end user device comprises interfacing with a first application of a first type executing locally on the first end user device, the first application being associated with a first user type, wherein the first end user device is connected to the real-time database via a first listener of the first application set on a table of the real-time database;

connecting the second end user device to the real-time database, wherein connecting the second end user device comprises interfacing with a second application of a second type executing locally on the second end user device, the second application being associated with a second user type, wherein the second end user device is connected to the real-time database via a second listener of the second application set on the table of the real-time database, wherein the first listener and the second listener are both set on the table of the real-time database; and coordinating an interactive workflow between the first end user device and the second end user device, the coordinating comprising:

receiving a first user input associated with a first step of the interactive workflow performed at the first end user device, wherein the first step prompts the second end user device to perform a second step of the interactive workflow;

updating a table element corresponding to the first user input;

prompting, via the second listener in real time, the second end user device to perform the second step at the second end user device;

receiving, from the second end user device, a second user input associated with the second step of the interactive workflow; and updating the table element corresponding to the second user input.

9. The computer-implemented method of claim 8, further comprising:

providing an indication of a value corresponding to the table element to the second end user device when prompting the second end user device to perform the second step at the second end user device.

10. The computer-implemented method of claim 8, wherein coordinating the interactive workflow between the first end user device and the second end user device comprises:

providing multiscreen interactive workflow facilitation services between the first end user device and the second end user device.

11. The computer-implemented method of claim 8, wherein prompting, via the second listener in real time, the second end user device to perform the second step at the second end user device comprises:

notifying the second end user device that the first end user device has completed the first step in the interactive workflow.

12. The computer-implemented method of claim 8, wherein the first user input includes a request to add a product or service to a virtual shopping cart.

13. The computer-implemented method of claim 12, wherein updating the table element corresponding to the first user input comprises:

updating one or more of a virtual cart identifier or a virtual cart state based on the request to add the product or the service to the virtual shopping cart.

14. The computer-implemented method of claim 13, wherein prompting, via the second listener in real time, the second end user device to perform the second step at the second end user device comprises:

providing the second end user device with the one or more of the virtual cart identifier or the virtual cart state.

15. A non-transitory machine-readable medium comprising instructions which, when read by a machine, cause the machine to perform operations for coordinating an interactive workflow between a first end user device having a first display and a first application, and a second end user device having a second display and a second application, the operations comprising, at least:

connecting the first end user device to a real-time database, wherein connecting the first end user device comprises interfacing with the first application of a first type executing locally on the first end user device, the first application being associated with a first user type, wherein the first end user device is connected to the real-time database via a first listener of the first application set on a table of the real-time database;

connecting the second end user device to the real-time database, wherein connecting the second end user device comprises interfacing with the second application of a second type executing locally on the second end user device, the second application being associated with a second user type, wherein the second end user device is connected to the real-time database via a second listener of the second application set on the table of the real-time database, wherein the first listener and the second listener are both set on the table of the real-time database; and coordinating an interactive workflow between the first end user device and the second end user device, the coordinating comprising:

receiving a first user input associated with a first step of the interactive workflow performed at the first end user device, wherein the first step prompts the second end user device to perform a second step of the interactive workflow;

updating a table element corresponding to the first user input;

prompting, via the second listener in real time, the second end user device to perform the second step at the second end user device;

receiving, from the second end user device, a second user input associated with the second step of the interactive workflow; and updating the table element corresponding to the second user input.

16. The non-transitory machine-readable medium of claim 15, further comprising:

providing an indication of a value corresponding to the table element to the second end user device when prompting the second end user device to perform the second step at the second end user device.

17. The non-transitory machine-readable medium of claim 15, wherein coordinating the interactive workflow between the first end user device and the second end user device comprises:

providing multiscreen interactive workflow facilitation services between the first end user device and the second end user device.

18. The non-transitory machine-readable medium of claim 15, wherein prompting, via the second listener in real time, the second end user device to perform the second step at the second end user device comprises:
  notifying the second end user device that the first end user device has completed the first step in the interactive workflow.

19. The non-transitory machine-readable medium of claim 15, wherein the first user input includes a request to add a product or service to a virtual shopping cart.

20. The non-transitory machine-readable medium of claim 19, wherein updating the table element corresponding to the first user input comprises:
  updating one or more of a virtual cart identifier or a virtual cart state based on the request to add the product or the service to the virtual shopping cart.

* * * * *